(12) United States Patent
Kruempelmann et al.

(10) Patent No.: US 12,339,852 B2
(45) Date of Patent: Jun. 24, 2025

(54) EXECUTION OF PROGRAMS AFTER IMPORT FOR CONFIGURATION CHANGES

(71) Applicant: SAP SE, Walldorf (DE)

(72) Inventors: Wulf Kruempelmann, Altlussheim (DE); Susanne Schott, Walldorf (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 18/469,732

(22) Filed: Sep. 19, 2023

(65) Prior Publication Data

US 2025/0094424 A1    Mar. 20, 2025

(51) Int. Cl.
*G06F 16/2455* (2019.01)
*G06F 16/22* (2019.01)
*G06F 16/2457* (2019.01)

(52) U.S. Cl.
CPC .... *G06F 16/24553* (2019.01); *G06F 16/2282* (2019.01); *G06F 16/24573* (2019.01)

(58) Field of Classification Search
CPC .............................................. G06F 16/24553
See application file for complete search history.

(56) References Cited

U.S. PATENT DOCUMENTS 9,213,728 B2 * 12/2015 Engelko ................. G06F 16/23
11,888,684 B1 * 1/2024 Sans ................... G06F 9/44505

OTHER PUBLICATIONS

Clemenss, XPRA-Execute ABAP Program Automatically After Transport Request Import, Application Development Blog Posts, Jun. 16, 2016 (Year: 2016).*
Fritsch, Dangers in SAP Transport Management Part 4, Mar. 30, 2021 (Year: 2021).*

* cited by examiner

*Primary Examiner* — Brittany N Allen
(74) *Attorney, Agent, or Firm* — Mintz Levin Cohn Ferris Glovsky and Popeo, P.C.

(57) ABSTRACT

Arrangements for execution of programs after import for configuration changes are provided. One or more execution of programs after import objects may be generated based on one or more database table definitions. Metadata configured by a user via a configuration interface of a user device may be received. The metadata may be associated with an update to at least a portion of data included in one or more data structures stored in one or more database systems. An execution of programs after import object associated with the update may be executed by identifying a scenario associated with the update, generating a WHERE clause including one or more conditions associated with the identified scenario, executing the WHERE clause, and automatically replacing, based on the received metadata, an old data value with a new data value.

14 Claims, 4 Drawing Sheets

EXECUTION OF PROGRAMS AFTER IMPORT FOR CONFIGURATION CHANGES

TECHNICAL FIELD

The subject matter described herein relates generally to data processing and more specifically to execution of programs after import for configuration changes.

BACKGROUND

After importing objects to a production system, software changes might be made. During a software change process, data might be modified due to new data structures, a new interpretation of the data, or a new template setup. Typically, this involves individual coding of the software changes, which is inefficient and error prone. For example, some requirements such as implementing the adoption of open transports or back-syncing to a configuration system is often forgotten, wrongly implemented, or is inconsistently implemented.

SUMMARY

Methods, systems, and articles of manufacture, including computer program products, are provided for execution of programs after import (XPRA) program for configuration changes. In one aspect, there is provided a system including at least one processor and at least one memory. The at least one memory can store instructions that cause operations when executed by the at least one processor. The operations may include: generating, at a configuration engine, one or more execution of programs after import objects based on one or more database table definitions; receiving, at the configuration engine, metadata configured by a user via a configuration interface of a user device, the metadata associated with an update to at least a portion of data included in one or more data structures stored in one or more database systems; and executing, by the configuration engine, an execution of programs after import object of the one or more execution of programs after import objects associated with the update by: identifying a scenario associated with the update; generating a WHERE clause including one or more conditions associated with the identified scenario; executing the WHERE clause; and automatically replacing, based on the received metadata, an old data value with a new data value.

In some variations, one or more of the features disclosed herein including the following features can optionally be included in any feasible combination. In some variations, the received metadata may include information of a source table, information of a target table, a field name, and one or more conditions to the field name.

In some variations, the WHERE clause may include a structured query language WHERE clause.

In some variations, the one or more database table definitions may include scenario information, release information, condition information, and data exchange information.

In some variations, executing the WHERE clause may include determining, by the configuration engine, whether a field includes a key field or a non-key field. In some variations, based on determining that the field includes a non-key field, old table content may be cached to a logging table, the old table content may be replaced with new table content. In some variations, based on determining that the field includes a key field, an old row may be deleted and a new row may be inserted to a database table.

In some variations, the operations may further include triggering a write-back application programming interface for updating a source system.

In another aspect, there is provided a method for execution of programs after import for configuration changes. The method may include: generating one or more execution of programs after import objects based on one or more database table definitions; receiving metadata configured by a user via a configuration interface of a user device, the metadata associated with an update to at least a portion of data included in one or more data structures stored in one or more database systems; and executing an execution of programs after import object of the one or more execution of programs after import objects associated with the update by: identifying a scenario associated with the update; generating a WHERE clause including one or more conditions associated with the identified scenario; executing the WHERE clause; and automatically replacing, based on the received metadata, an old data value with a new data value.

In some variations, one or more of the features disclosed herein including the following features can optionally be included in any feasible combination. In some variations, the received metadata may include: information of a source table, information of a target table, a field name, and one or more conditions to the field name.

In some variations, the WHERE clause may include a structured query language WHERE clause.

In some variations, the one or more database table definitions may include scenario information, release information, condition information, and data exchange information.

In some variations, executing the WHERE clause may include determining whether a field includes a key field or a non-key field. In some variations, based on determining that the field includes a non-key field, old table content may be cached to a logging table, the old table content may be replaced with new table content. In some variations, based on determining that the field includes a key field, an old row may be deleted and a new row may be inserted to a database table.

In some variations, the operations may further include triggering a write-back application programming interface for updating a source system.

In another aspect, there is provided a computer program product that includes a non-transitory computer readable medium. The non-transitory computer readable medium may store instructions that cause operations when executed by at least one data processor. The operations may include: generating one or more execution of programs after import objects based on one or more database table definitions; receiving metadata configured by a user via a configuration interface of a user device, the metadata associated with an update to at least a portion of data included in one or more data structures stored in one or more database systems; and executing an execution of programs after import object of the one or more execution of programs after import objects associated with the update by: identifying a scenario associated with the update; generating a WHERE clause including one or more conditions associated with the identified scenario; executing the WHERE clause; and automatically replacing, based on the received metadata, an old data value with a new data value.

In some variations, one or more of the features disclosed herein including the following features can optionally be included in any feasible combination. In some variations, the received metadata may include: information of a source table, information of a target table, a field name, and one or more conditions to the field name.

In some variations, the one or more database table definitions may include scenario information, release information, condition information, and data exchange information.

In some variations, the non-transitory computer readable medium may store instructions that that cause operations further including triggering a write-back application programming interface for updating a source system.

Implementations of the current subject matter can include methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes, it should be readily understood that such features are not intended to be limiting. The claims that follow this disclosure are intended to define the scope of the protected subject matter.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

To make changes in business configuration during an upgrade easier, aspects of the disclosure may build an after import program that directly changes data in a system based on a dynamic WHERE condition (e.g., structured query language (SQL) WHERE condition) in a table. For instance, an execution of programs after import (e.g., XPRA framework/program provided by SAP SE of Walldorf, Germany) may be executed every time a software change is done and the execution of programs after import object is assigned to it. The execution of programs after import object may be and/or include a method configured to modify one or more databases so that the database(s) are compatible with, for example, a system upgrade. Further aspects of the disclosure provide an after import program, based on one or more database table definitions, that does not require extensive coding (e.g., low-code or no-code development). For example, a configuration engine may enable users to make configuration changes or software upgrades via a visual development interface (e.g., graphical user interface including drag-and-drop functionality and other graphical building tools for streamlining development). These and various other arrangements will be discussed more fully below.

Figure 1:
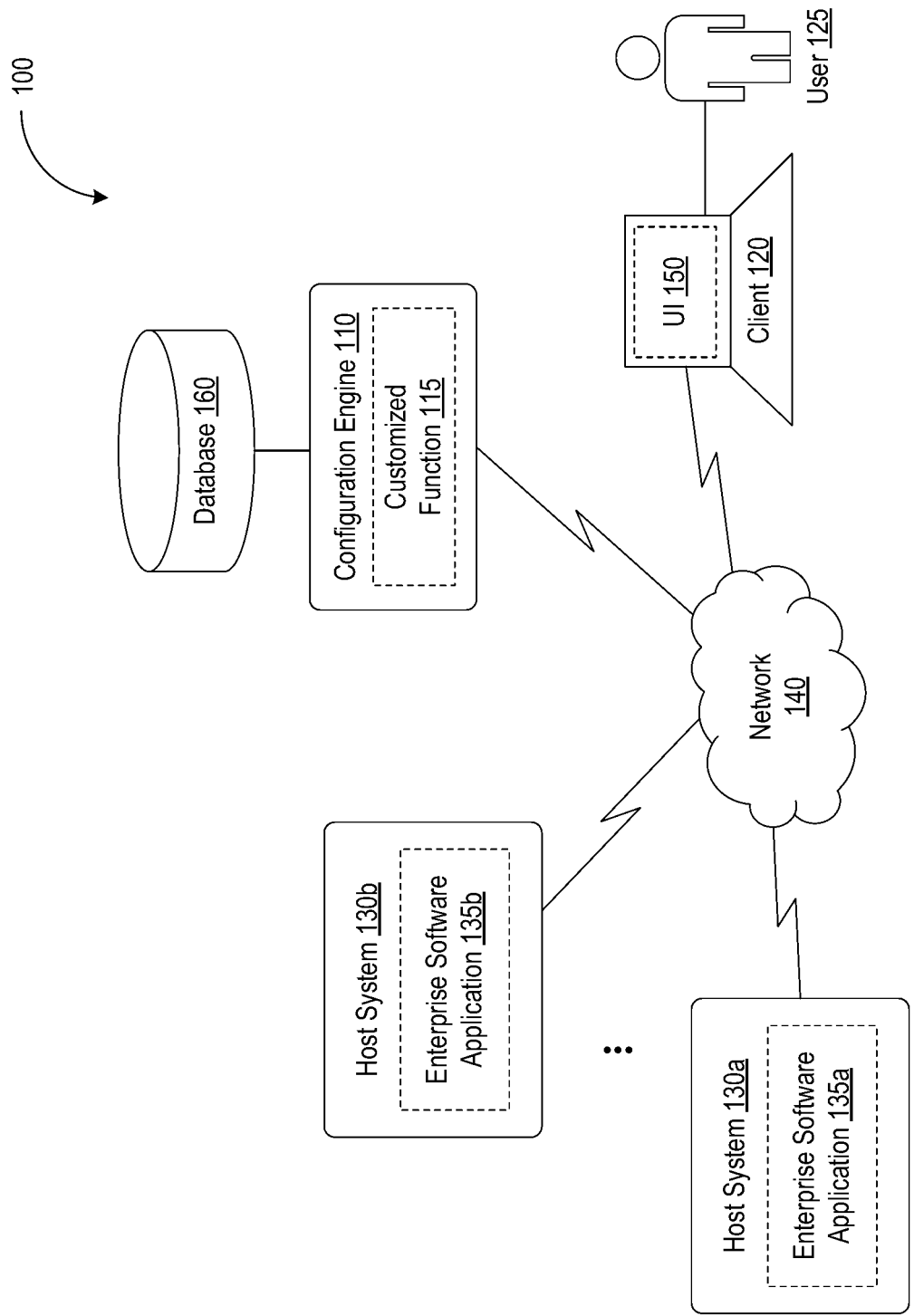
FIG. 1 depicts an illustrative computing environment for an after import program for configuration changes in accordance with some example embodiments.

FIG. 1 depicts a system diagram illustrating a configuration system 100, in accordance with some example embodiments. Referring to FIG. 1, the configuration system 100 may include a configuration engine 110 and a client 120. The configuration system 100 may further include a plurality of host systems including, for example, a first host system 130a, a second host system 130b, and/or the like. As shown in FIG. 1, the configuration engine 110, the client 120, the first host system 130a, and the second host system 130b may be communicatively coupled via a network 140. The network 140 may be a wired and/or wireless network including, for example, a wide area network (WAN), local area network (LAN), a virtual local area network (VLAN), the Internet, and/or the like. Meanwhile, the first host system 130a and/or the second host system 130b may be cloud-based systems hosted on one or more cloud-computing platforms.

In some example embodiments, the configuration engine 110 may be centralize the configuration of multiple enterprise software applications, including enterprise software applications distributed across different host systems. For example, as shown in FIG. 1, a user 125 at the client 120 may interact with the configuration engine 110 in order to customize a first enterprise software application 135a deployed at the first host system 130a as well as a second enterprise software application 135b deployed at the second host system 130b. The first enterprise software application 135a and/or the second enterprise software application 135b may be an enterprise resource planning (ERP) software application, a customer relationship management (CRM) software application, and/or the like. The user 125 may customize the first enterprise software application 135a and the second enterprise software application 135b in order to implement a customized function 115 requiring the first enterprise software application 135a as well as the second enterprise software application 135b.

In some example embodiments, in order to implement the customized function 115, the user 125 may interact with the configuration engine 110 via a user interface 150 presented at the client 120. The user interface 150 may be configured to receive, from the user 125, one or more inputs scoping the customized function 115. For example, the user interface 150 may be configured to receive, from the user 125 at the client 120, a first input selecting a function. Moreover, the user interface 150 may be configured to receive, from the user 125 at the client 120, a second input specifying one or more customizations that are applied to the selected function to generate the customized function 115. It should be appreciated that the configuration engine 110 may be configured to generate a series of queries for scoping the customized function 115. As such, the first input and/or the second input may be responses to the queries generated by the configuration engine 110 and displayed at the user interface 150.

Examples of the customized function 115 may include billing, invoicing, procurement, payroll, time and attendance management, recruiting and onboarding, learning and development, performance and compensation, and workforce planning. In order to accomplish the customized function 115, the first enterprise software application 135a and the second enterprise software application 135b may operate on the same data. Accordingly, the first enterprise software application 135a and the second enterprise software application 135b may each be implemented based on a template. The template may define the manner in which data is stored in one or more database tables operated upon by the first enterprise software application 135a and the second enterprise software application 135b while performing the customized function 115. For instance, the template may specify the columns that form the entries occupying the rows in each one of the database tables operated upon by the first enterprise software application 135a and the second enterprise software application 135b while performing the customized function 115.

In some example embodiments, the configuration engine 110 may maintain (e.g., store) configuration data (e.g., for an enterprise software application 135a, 135b) in one or more database tables at a database 160 coupled with the configuration engine 110.

Figure 2:
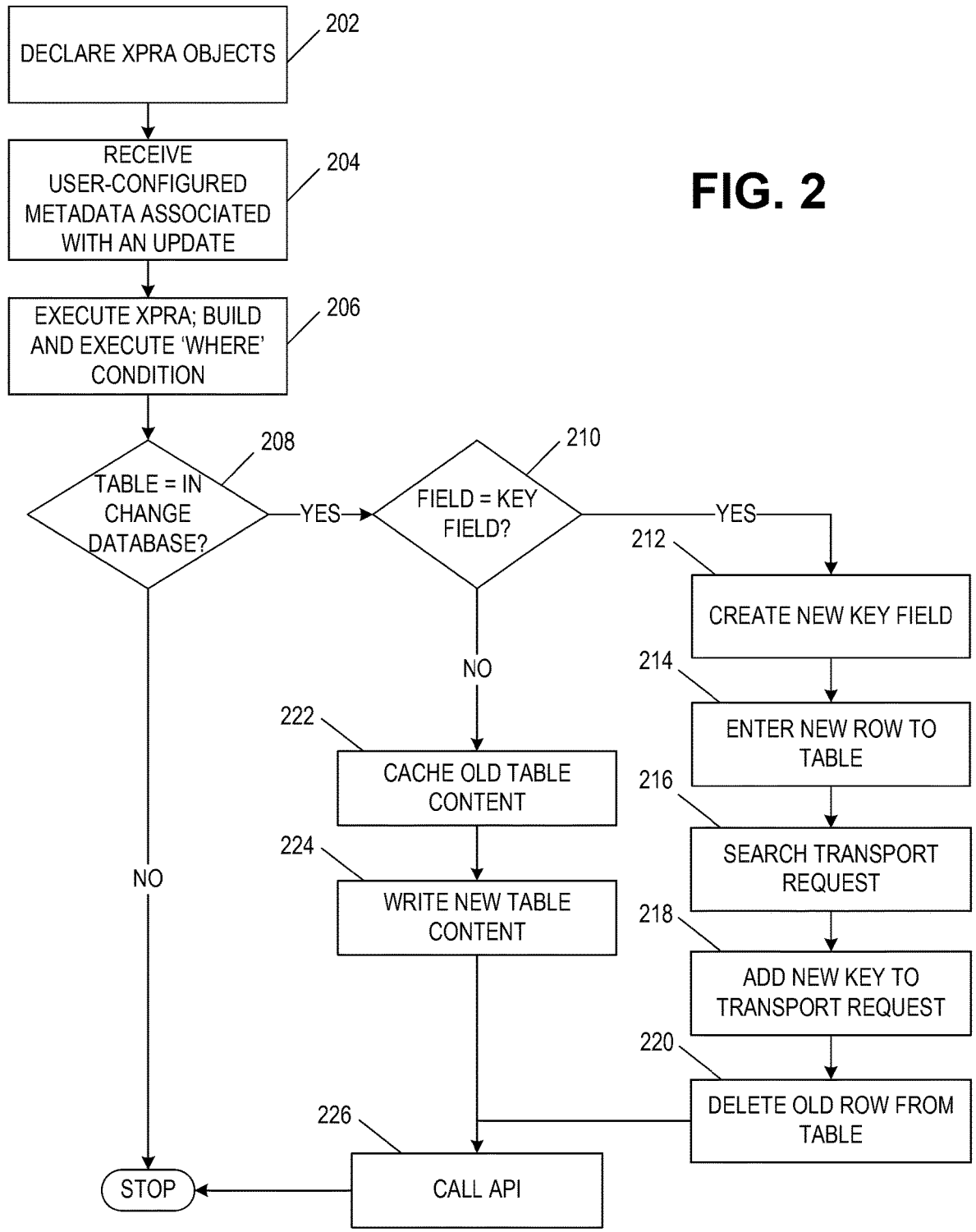
FIG. 2 depicts a flowchart illustrating a process for implementing an after import program for configuration changes in accordance with some example embodiments.

FIG. 2 depicts a flowchart 200 illustrating a process for implementing an after import program for configuration changes, in accordance with some example embodiments. Referring to FIG. 2, at step 202, the configuration engine 110 may generate/declare one or more execution of programs after import objects based on one or more database table definitions. The one or more database table definitions may include at least scenario information (e.g., scenarios relevant for a release hotfix), release information (e.g., a release/software version for each XPRA), condition information (e.g., SQL WHERE clause used to filter records/rows and extract those records that fulfill a specified condition), and data exchange information. The definition of a scenario might include a scenario name, component information, user information, a time, a date, and/or the like. The definition of a release might include a scenario name, release information, a hotfix (e.g., a patch or quick-fix engineering update), and/or the like. The definition of a WHERE condition might include a scenario name and a condition number (e.g., a table, a field name, a comparator, a field value), and/or the like. The definition of exchange data might include a scenario name, information on an old/source table, information on an old field name, and possibilities for data exchange including (e.g., old value information, new/target table information, new field information, and new value information). It will be appreciated that other and/or different tables associated with defining a condition may also be provided. As used herein, an execution of programs after import object (XPRA object, also referred to as XPRA) is a program that is executed after all objects included in a transport request have been imported.

Figure 3:
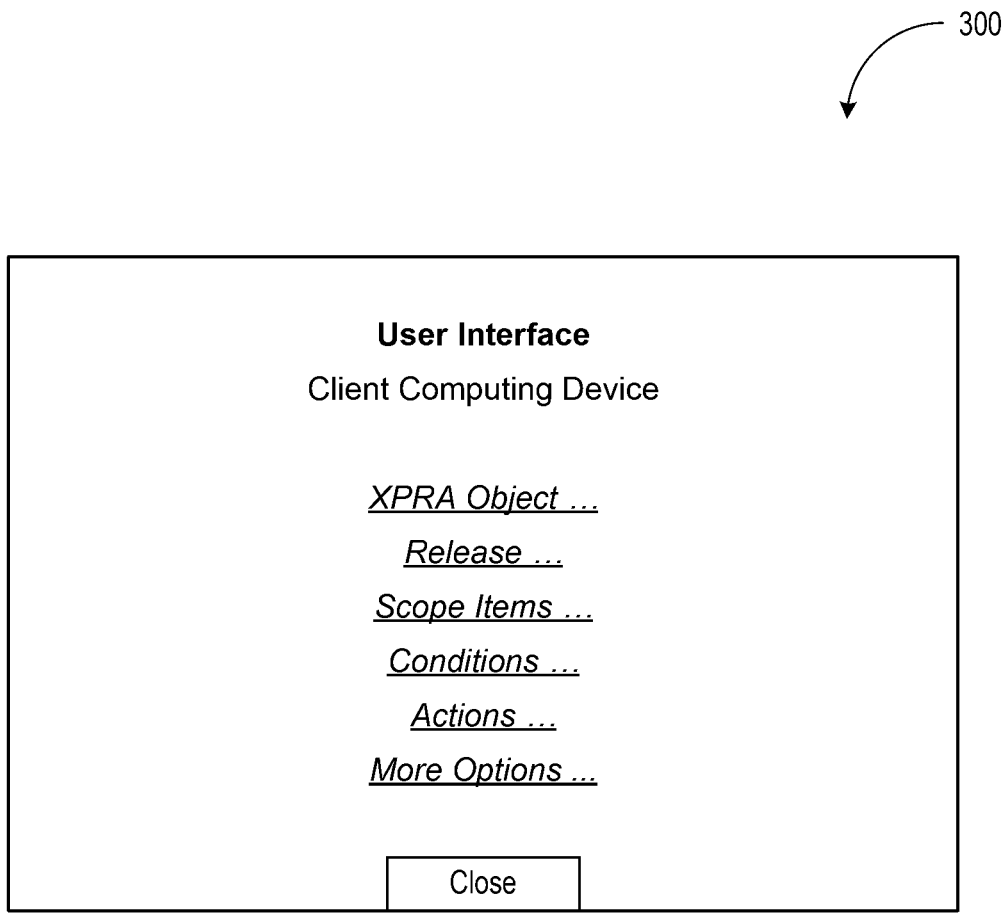
FIG. 3 depicts an example user interface for implementing an after import program for configuration changes in accordance with some example embodiments.

At step 204, the configuration engine 110 may receive metadata configured by a user (e.g., user 125) via a configuration interface (e.g., UI 150) of a user device (e.g., client 150), associated with a software change or update to at least a portion of data included in one or more data structures (e.g., database 160) stored in one or more database systems. For instance, a user may enter metadata information associated with data that is to be modified, and indicate the conditions under which the data is to be modified during a software change process (e.g., during an upgrade). In some examples, the metadata may include information of a source table, information of a target table, a field name, one or more conditions to the field name, and/or the like. In some examples, an upgrade may be local, and there may not be a target table designated. For instance, a user computing device (e.g., client 120) may display and/or otherwise present one or more graphical user interfaces similar to graphical user interface 300, which is illustrated in FIG. 3. As shown in FIG. 3, graphical user interface 300 may include text and/or other information associated with defining meta information (e.g., execution of programs after import objects, release information, configuration scopes, conditions, actions, and/or the like). It will be appreciated that other and/or different graphical user interfaces may also be provided.

Returning to FIG. 2, at step 206, during a software change (e.g., at each software upgrade), an execution of programs after import object for a current release may be started. The configuration engine 110 may build and execute a structured query language (SQL) WHERE clause (e.g., or other SAP compatible "where" clause) in an internal table of entries based on a scenario that is relevant for the release hotfix. For example, the configuration engine 110 may identify a scenario associated with the software change (e.g., update) and generate a WHERE clause including one or more conditions associated with the identified scenario.

The WHERE clause as used herein specifies a selection condition, join condition, update condition, or delete condition to filter rows of data. The WHERE clause specifies a selection condition for filter input from data sources in a query element (e.g., objects used for building of queries). The WHERE clause provides join conditions in a FROM clause (e.g., naming one or more tables or views from which data values are retrieved by the query). In some examples, the WHERE clause may apply conditions in a SELECT, INSERT, UPDATE, or DELETE statement. In some examples, the WHERE clause may be used with AND statements to include different conditions.

At 208, the configuration engine 110 may determine whether table content is to be changed. For a result of the dataset, the configuration engine 110 searches for content from a table of exchange data information, and automatically exchanges/replaces old data values with new data values. If no change is necessary (e.g., 208: NO), then the process ends. If a change is to be made (e.g., 208: YES) the configuration engine 110 may determine whether a field of the query is a key field or non-key field.

In a case where the field is a key field/a new identifier (e.g., 210: YES), the configuration engine 110 may, at step 212, create a new key field and at step 214, add a new row into the table. At step 216, the configuration engine 110 may parse the open transports in the system (e.g., search for transport requests containing the old data). At step 218, the configuration engine 110 may add the key for the new data to the same transport request (e.g., edit the transport request). At step 220, the configuration engine 110 may delete the old row from the table (e.g., select old data and replace the data by actual ones).

In a case where the field is a normal field (e.g., 210: NO), the configuration engine 110 may, at step 222, cache the old table content to a logging table. At step 224, the configuration engine 110 may write the new table content (e.g., exchanging the old table content with the new table content).

At 226, the configuration engine 110 may call an application programming interface (API), notifying a configuration platform (e.g., a centralized configuration platform for scoping, configuring, and implementing end-to-end enterprise processes) that a value has changed. For example, the configuration engine 110 may trigger a write-back API of the configuration framework to retrieve the active values and update source systems, such as databases, to maintain systems of record. Advantageously, data may be modified automatically at each upgrade, and no programming is required for implementing configuration changes.

In addition, the configuration engine 110 may search for entries with the old value and add an entry with the new value. Thereafter, all the changes are transported and there is no overwrite. For older, already released transports, the configuration engine 110 may create a copy of the transport request containing only this single entry and release it automatically.

Figure 4:
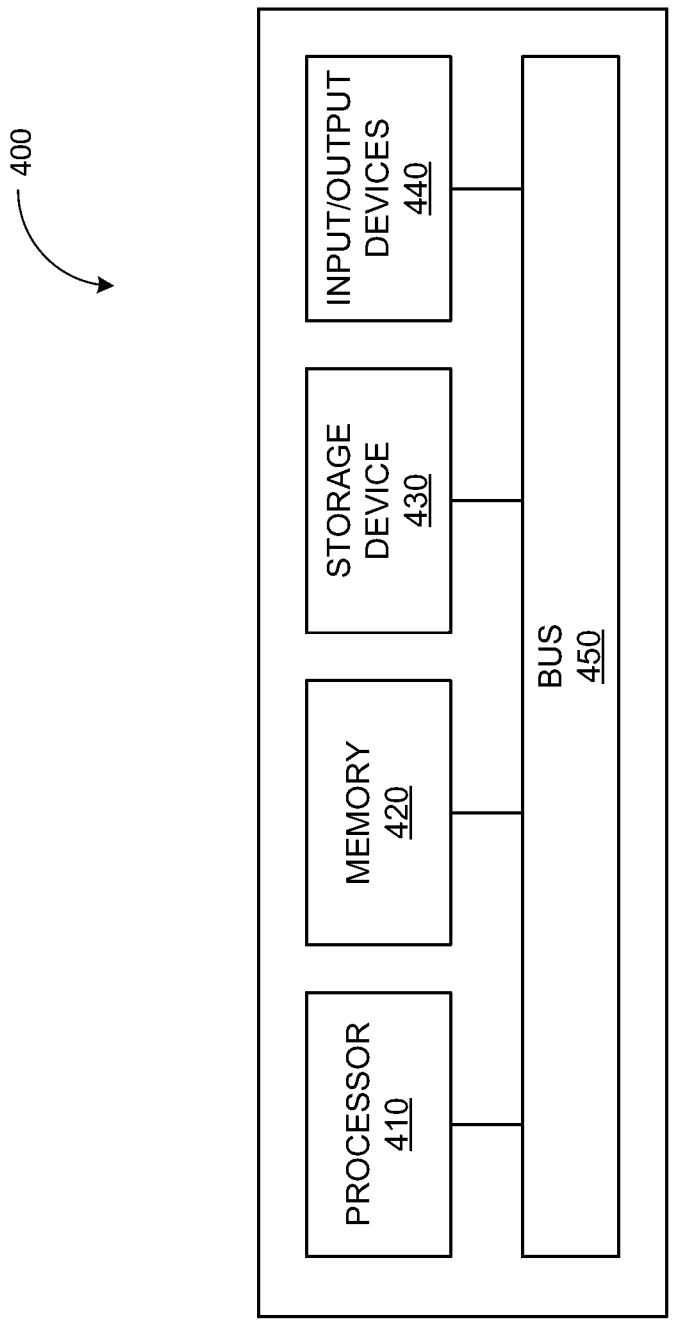
FIG. 4 depicts a block diagram illustrating a computing system, in accordance with some example embodiments.

FIG. 4 depicts a block diagram illustrating a computing system 400 consistent with implementations of the current subject matter. Referring to FIGS. 1-4, the computing system 400 can be used to implement the configuration engine 110 and/or any components therein.

As shown in FIG. 4, the computing system 400 can include a processor 410, a memory 420, a storage device 430, and input/output devices 440. The processor 410, the memory 420, the storage device 430, and the input/output devices 440 can be interconnected via a system bus 450. The processor 410 is capable of processing instructions for execution within the computing system 400. Such executed instructions can implement one or more components of, for example, the configuration engine 110. In some implementations of the current subject matter, the processor 410 can be a single-threaded processor. Alternately, the processor 410 can be a multi-threaded processor. The processor 410 is capable of processing instructions stored in the memory 420 and/or on the storage device 430 to display graphical information for a user interface provided via the input/output device 440.

The memory 420 is a computer readable medium such as volatile or non-volatile that stores information within the computing system 400. The memory 420 can store data structures representing configuration object databases, for example. The storage device 430 is capable of providing persistent storage for the computing system 400. The storage device 430 can be a solid-state device, a floppy disk device, a hard disk device, an optical disk device, a tape device, and/or any other suitable persistent storage means. The input/output device 440 provides input/output operations for the computing system 400. In some implementations of the current subject matter, the input/output device 440 includes a keyboard and/or pointing device. In various implementations, the input/output device 440 includes a display unit for displaying graphical user interfaces.

According to some implementations of the current subject matter, the input/output device 440 can provide input/output operations for a network device. For example, the input/output device 440 can include Ethernet ports or other networking ports to communicate with one or more wired and/or wireless networks (e.g., a local area network (LAN), a wide area network (WAN), the Internet).

In some implementations of the current subject matter, the computing system 400 can be used to execute various interactive computer software applications that can be used for organization, analysis and/or storage of data in various (e.g., tabular) format (e.g., Microsoft Excel®, and/or any other type of software). Alternatively, the computing system 400 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities (e.g., SAP Integrated Business Planning add-in for Microsoft Excel as part of the SAP Business Suite, as provided by SAP SE, Walldorf, Germany) or can be stand-alone computing products and/or functionalities. Upon activation within the applications, the functionalities can be used to generate the user interface provided via the input/output device 440. The user interface can be generated and presented to a user by the computing system 400 (e.g., on a computer screen monitor, etc.).

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

In view of the above-described implementations of subject matter this application discloses the following list of examples, wherein one feature of an example in isolation or more than one feature of said example taken in combination and, optionally, in combination with one or more features of one or more further examples are further examples also falling within the disclosure of this application:

Example 1: A system, comprising:
at least one data processor; and
at least one memory storing instructions, which when executed by the at least one data processor, result in operations comprising:
generating, at a configuration engine, one or more execution of programs after import objects based on one or more database table definitions;
receiving, at the configuration engine, metadata configured by a user via a configuration interface of a user device, the metadata associated with an update to at least a portion of data included in one or more data structures stored in one or more database systems; and
executing, by the configuration engine, an execution of programs after import object of the one or more execution of programs after import objects associated with the update by:
identifying a scenario associated with the update;
generating a WHERE clause including one or more conditions associated with the identified scenario;
executing the WHERE clause; and
automatically replacing, based on the received metadata, an old data value with a new data value.

Example 2: The system of Example 1, wherein the received metadata comprises: information of a source table, information of a target table, a field name, and one or more conditions to the field name.

Example 3: The system of any of Examples 1-2, wherein the WHERE clause is a structured query language WHERE clause.

Example 4: The system of any of Examples 1-3, wherein the one or more database table definitions comprise: scenario information, release information, condition information, and data exchange information.

Example 5: The system of any of Examples 1-4, wherein executing the WHERE clause further comprises: determining, by the configuration engine, whether a field comprises a key field or a non-key field.

Example 6: The system of any of Examples 1-5, further comprising, based on determining that the field comprises a non-key field: caching old table content to a logging table; and replacing the old table content with new table content.

Example 7: The system of any of Examples 1-6, further comprising, based on determining that the field comprises a key field, deleting an old row of a database table and inserting a new row to the database table.

Example 8: The system of any of Examples 1-7, further comprising: triggering a write-back application programming interface for updating a source system.

Example 9: A computer-implemented method, comprising:
generating one or more execution of programs after import objects based on one or more database table definitions;
receiving metadata configured by a user via a configuration interface of a user device, the metadata associated with an update to at least a portion of data included in one or more data structures stored in one or more database systems; and
executing an execution of programs after import object of the one or more execution of programs after import objects associated with the update by:
identifying a scenario associated with the update;
generating a WHERE clause including one or more conditions associated with the identified scenario;
executing the WHERE clause; and
automatically replacing, based on the received metadata, an old data value with a new data value.

Example 10: The method of Example 9, wherein the received metadata comprises: information of a source table, information of a target table, a field name, and one or more conditions to the field name.

Example 11: The method of any of Examples 9-10, wherein the WHERE clause is a structured query language WHERE clause.

Example 12: The method of any of Examples 9-11, wherein the one or more database table definitions comprise: scenario information, release information, condition information, and data exchange information.

Example 13: The method of any of Examples 9-12, wherein executing the WHERE clause further comprises determining whether a field comprises a key field or a non-key field.

Example 14: The method of any of Examples 9-13, further comprising, based on determining that the field comprises a non-key field: caching old table content to a logging table; and replacing the old table content with new table content.

Example 15: The method of any of Examples 9-14, further comprising, based on determining that the field comprises a key field, deleting an old row of a database table and inserting a new row to the database table.

Example 16: The method of any of Examples 9-15, further comprising: triggering a write-back application programming interface for updating a source system.

Example 17: A non-transitory computer readable medium storing instructions, which when executed by at least one data processor, result in operations comprising:
generating one or more execution of programs after import objects based on one or more database table definitions;
receiving metadata configured by a user via a configuration interface of a user device, the metadata associated with an update to at least a portion of data included in one or more data structures stored in one or more database systems; and
executing an execution of programs after import object of the one or more execution of programs after import objects associated with the update by:
identifying a scenario associated with the update;
generating a WHERE clause including one or more conditions associated with the identified scenario;
executing the WHERE clause; and
automatically replacing, based on the received metadata, an old data value with a new data value.

Example 18: The non-transitory computer readable medium of Example 17, wherein the received metadata comprises: information of a source table, information of a target table, a field name, and one or more conditions to the field name.

Example 19: The non-transitory computer readable medium of any of Examples 17-18, wherein the one or more database table definitions comprise: scenario information, release information, condition information, and data exchange information.

Example 20: The non-transitory computer readable medium of any of Examples 17-19, wherein the instructions, when executed by the at least one data processor, further result in operations comprising triggering a write-back application programming interface for updating a source system.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. For example, the logic flows may include different and/or additional operations than shown without departing from the scope of the present disclosure. One or more operations of the logic flows may be repeated and/or omitted without departing from the scope of the present disclosure. Other implementations may be within the scope of the following claims.

What is claimed is:

1. A system, comprising:
at least one data processor; and at least one memory storing instructions, which when executed by the at least one data processor, result in operations comprising:
generating, at a configuration engine, one or more execution of programs after import objects based on one or more database table definitions;
receiving, at the configuration engine, metadata configured by a user via a configuration interface of a user device, the metadata associated with an update to at least a portion of data included in one or more data structures stored in one or more database systems; and
executing, by the configuration engine, an execution of programs after import object of the one or more execution of programs after import objects associated with the update by:
identifying a scenario associated with the update, and
generating a WHERE clause including one or more conditions associated with the identified scenario;
executing the WHERE clause, wherein executing the WHERE clause comprises determining whether a field comprises a key field or a non-key field;
caching old table content to a logging table and replacing the old table content with new table content based on determining that the field comprises a non-key field; and
deleting an old row of a database table and inserting a new row to the database table based on determining that the field comprises a key field.

2. The system of claim 1, wherein the received metadata comprises: information of a source table, information of a target table, a field name, and one or more conditions to the field name.

3. The system of claim 1, wherein the WHERE clause is a structured query language WHERE clause.

4. The system of claim 1, wherein the one or more database table definitions comprise: scenario information, release information, condition information, and data exchange information.

5. The system of claim 1, further comprising: triggering a write-back application programming interface for updating a source system.

6. A computer-implemented method, comprising:
generating one or more execution of programs after import objects based on one or more database table definitions;
receiving metadata configured by a user via a configuration interface of a user device, the metadata associated with an update to at least a portion of data included in one or more data structures stored in one or more database systems; and
executing an execution of programs after import object of the one or more execution of programs after import objects associated with the update by:
identifying a scenario associated with the update, and
generating a WHERE clause including one or more conditions associated with the identified scenario;
executing the WHERE clause, wherein executing the WHERE clause comprises determining whether a field comprises a key field or a non-key field;
caching old table content to a logging table and replacing the old table content with new table content based on determining that the field comprises a non-key field; and automatically replacing, based on the received metadata, an old data value with a new data value deleting an old row of a database table and inserting a new row to the database table based on determining that the field comprises a key field.

7. The method of claim 6, wherein the received metadata comprises:
information of a source table, information of a target table, a field name, and one or more conditions to the field name.

8. The method of claim 6, wherein the WHERE clause is an SQL WHERE clause.

9. The method of claim 6, wherein the one or more database table definitions comprise: scenario information, release information, condition information, and data exchange information.

10. The method of claim 6, further comprising: triggering a write-back application programming interface for updating a source system.

11. A non-transitory computer readable medium storing instructions, which when executed by at least one data processor, result in operations comprising:
generating one or more execution of programs after import objects based on one or more database table definitions; receiving metadata configured by a user via a configuration interface of a user device, the metadata associated with an update to at least a portion of data included in one or more data structures stored in one or more database systems; and
executing an execution of programs after import object of the one or more execution of programs after import objects associated with the update by:
identifying a scenario associated with the update, and
generating a WHERE clause including one or more conditions associated with the identified scenario;
executing the WHERE clause, wherein executing the WHERE clause comprises determining whether a field comprises a key field or a non-key field;
caching old table content to a logging table and replacing the old table content with new table content based on determining that the field comprises a non-key field; and
automatically replacing, based on the received metadata, an old data value with a new data value deleting an old row of a database table and inserting a new row to the database table based on determining that the field comprises a key field.

12. The non-transitory computer readable medium of claim 11, wherein the received metadata comprises: information of a source table, information of a target table, a field name, and one or more conditions to the field name.

13. The non-transitory computer readable medium of claim 11, wherein the one or more database table definitions comprise: scenario information, release information, condition information, and data exchange information.

14. The non-transitory computer readable medium of claim 11, wherein the instructions, when executed by the at least one data processor, further result in operations comprising: triggering a write-back application programming interface for updating a source system.

\* \* \* \* \*